US006573989B2

(12) United States Patent
Suzuki et al.

(10) Patent No.: US 6,573,989 B2
(45) Date of Patent: Jun. 3, 2003

(54) SPECTROMETER

(75) Inventors: Toru Suzuki, Hiratsuka (JP); Osamu Wakabayashi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 09/801,001

(22) Filed: Mar. 8, 2001

(65) Prior Publication Data

US 2001/0024275 A1 Sep. 27, 2001

(30) Foreign Application Priority Data

Mar. 16, 2000 (JP) ....................................... 2000-074154

(51) Int. Cl.[7] .................................................. G01J 3/28

(52) U.S. Cl. ....................... 356/328; 356/326; 356/333; 356/334

(58) Field of Search ................................ 356/328, 326, 356/334, 333

(56) References Cited

FOREIGN PATENT DOCUMENTS

JP 11132848 5/1999

OTHER PUBLICATIONS

Suzuki et al, High–resolution Multi Grating Spectrometer for High Quality Deep UV Light Source Production, 2001 (presented at SPIE Optical Microlithography XIV conference, Feb. 27–Mar. 2, 2001), SPIE, Proceedings of SPIE vol. 4346, pp. 1254–1261.*

* cited by examiner

*Primary Examiner*—Audrey Chang
*Assistant Examiner*—Denise S. Allen
(74) *Attorney, Agent, or Firm*—Stevens, Davis, Miller & Mosher, LLP

(57) ABSTRACT

A spectrometer measures a spectrum of a light beam supplied from a light source so as to obtain fine information and coarse information of the spectrum easily. This spectrometer has a holographic grating, an Echelle grating, a rotation stage and a line sensor. In the case where a single pass beam is to be detected, a control processing unit controls the rotation stage so as to rotate the Echelle grating from the Littrow arrangement by a predetermined angle $\delta_1$. On the other hand, in the case where a double pass beam is to be detected, the control processing unit controls the rotation stage so as to rotate the Echelle grating from the Littrow arrangement by a predetermined angle $\delta_2$.

8 Claims, 6 Drawing Sheets

23
A/D CONVERSION UNIT
DATA PROCESSING UNIT
25
18
24
17
15a
10
11
15
20
14a
$\theta$
SINGLE PASS BEAM
DOUBLE PASS BEAM
12
13
14
LIGHT SOURCE
19

SPECTROMETER

BACKGROUND OF THE INVENTION

1. Field of the Invention

The present invention relates to a spectrometer which is used to measure a spectrum of a light beam supplied from a light source, in particular, a spectrometer that can obtain, from a spectrum including specified wavelength components, fine information (information of a spectral component in a relatively narrow range in the vicinity of a peak of the spectrum) at high accuracy and coarse information (information of a spectral component in a relatively wide range around the peak, in which information of a foot part of the spectrum is important).

2. Description of a Related Art

A spectrometer disclosed in Japanese patent application publication JP-A-11-132848 is known as an optical instrument which is used to measure a spectrum of a light beam supplied from a light source. FIG. 10 shows constitution of the spectrometer.

The spectrometer as shown in FIG. 10 has slit board 100, collimator lens 101, beam splitter 102, diffraction grating 103, mirror 104, magnifier lens 105 and line sensor 106.

In the spectrometer, a light beam supplied from a light source passes through slit board 100 and is changed into a parallel light beam by collimator lens 101. In beam splitter 102, the parallel light beam is divided into a reflected light beam which travels toward collimator lens 101 and a transmitted light beam which travels toward diffraction grating 103. The transmitted light beam is incident into diffraction grating 103, and a part of the transmitted light beam is diffracted toward beam splitter 102 as a first diffraction light beam (a single pass beam).

A part of the single pass beam is reflected by beam splitter 102 toward a direction shifted by a slight angle from the optical axis of collimator lens 101. On the other hand, the rest of the single pass beam passes through beam splitter 102.

The single pass beam reflected by beam splitter 102 is incident into diffraction grating 103 again, and a part of the incident light beam is diffracted as a second diffraction light beam (a double pass beam) from diffraction grating 103 to beam splitter 102. A number of times of diffraction of the double pass beam is one more than that of the single pass beam, so that a dispersion value (a difference in wavelengths which corresponds to an interval of adjacent two channels of line sensor 106) of the double pass beam is small. Therefore, the double pass beam realizes high resolving power.

And then, a part of the double pass beam is reflected by beam splitter 102 toward a direction shifted by a slight angle from the optical axis of collimator lens 101. On the other hand, the rest of the double pass beam passes through beam splitter 102.

By the way, when an excimer laser source is used as a light source, according to performance of the excimer laser source and so on, a useless component may appear in a foot part of the spectrum which is distant from a peak of the spectrum, and a blur may arise by chromatic aberration of the optical system. Therefore, in measurement of a spectrum of a light source, it is necessary to carry out not only measurement in the vicinity of a peak of the spectrum with higher resolving power (fine measurement) but also measurement in a foot part of the spectrum with lower resolving power (coarse measurement).

In the conventional spectrometer as shown in FIG. 10, line sensor 106 can detect either a single pass beam or a double pass beam in general. FIG. 10 shows the case where line sensor 106 detects a single pass beam.

Therefore, two spectrometers which are different in a value of resolving power are prepared. At first, measurement of a spectrum of an excimer laser beam is carried out by using a spectrometer for the single pass beam, which has lower resolving power, so as to obtain coarse information of the spectrum. Next, the spectrometer for the single pass beam is replaced with a spectrometer for the double pass beam, which has higher resolving power, and measurement of the spectrum is carried out so as to obtain fine information of the spectrum. Further, a compound spectrum of the excimer laser beam is obtained by compounding the coarse information and the fine information together under a suitable processing.

As another way, two diffraction gratings which are different in the number of groove lines are prepared. At first, measurement of a spectrum of an excimer laser beam is carried out by installing a diffraction grating for the single pass beam to the body of the apparatus so as to obtain coarse information of the spectrum. Next, the diffraction grating for the single pass beam is replaced with a diffraction grating for the double pass beam, which is different from the diffraction grating for the single pass beam in the number of groove lines, and measurement of the spectrum is carried out so as to obtain fine information of the spectrum. Further, a compound spectrum of the excimer laser beam is obtained by compounding the coarse information and the fine information together under a suitable processing.

In the spectrometer disclosed in JP-A-11-132848, however, the following problems cause when the coarse information and the fine information in the spectrum of the excimer laser beam is obtained.

(a) The cost becomes higher because two spectrometers or two diffraction gratings need to be prepared for the single pass beam and the double pass beam.

(b) The process of measuring a spectrum becomes more complicated because one spectrometer or diffraction grating for the single pass beam needs to be replaced with the other for the double pass beam.

Therefore, it is proposed to enlarge a size of the line sensor in the longitudinal direction so as to focus the single pass beam and the double pass beam on channels of the line sensor (different channels are used for the single pass beam and for the double pass beam).

However, according to the above-mentioned proposal, either the single pass beam or the double pass beam is focused on a channel in the edge portion of the line sensor. As a result, the inaccurate detection result due to image shift may be obtained.

Further, it is also proposed to rotate a diffraction grating adequately so as to focus the single pass beam or the double pass beam on channels of a line sensor. That is, the single pass beam is focused on channels of the line sensor by rotating diffraction grating 103 from the Littrow arrangement, in which an incident angle is equal to an output angle, by a predetermined slight angle. Next, the double pass beam is focused on channels of the line sensor by rotating diffraction grating 103 from the Littrow arrangement by a predetermined slight angle (which is different from that in detecting a single pass beam).

However, according to the above-mentioned proposal, there is a problem that it is practically difficult to realize high resolving power without enlarging a size of the apparatus.

The resolving power of a spectrometer according to the above-mentioned proposal (which will be explained with referring to FIG. 10 in the following) becomes higher as a dispersion value in the line sensor becomes smaller. The dispersion value is defined by the following expression:

$$\text{disp}=sw/(f\cdot\text{angDisp}) \quad (1)$$

Where each symbol represents the following value.

disp: a dispersion value sw (=swd/mag): a one-to-one conversion size of the line sensor swd: a size of the line sensor mag: a magnification rate of a magnifier lens f: a focal length of a collimator lens angDisp: an angular dispersion value Furthermore, an angular dispersion value in the expression (1) is given by the following expressions:

$$\text{angDisp1}=m/(d\cdot\cos\beta) \quad (2)$$

$$\text{angDisp2}=2m/(d\cdot\cos\beta) \quad (3)$$

Where each symbol represents the following value.

angDisp1: an angular dispersion value of the single pass beam angDisp2: an angular dispersion value of the double pass beam m: an order of diffraction d: an interval of groove lines of a diffraction grating β: an output angle from a diffraction grating Although JP-A-11-132848 discloses no concrete example of diffraction grating 103, an Echelle grating is generally used as a suitable diffraction grating for obtaining such a large diffraction angle as shown in FIG. 10. The Echelle grating is designed so that the diffraction efficiency becomes higher when an incident angle and an output angle are almost the same as a prescribed blaze angle. The blaze angle needs to be prescribed large in order to obtain a large angular dispersion value.

In the present technology level, however, an Echelle grating having a blaze angle of about 80° is a marginal one which has been made, and it is very difficult to make an Echelle grating having the blaze angle larger than about 80°.

Accordingly, as seen from the expressions (1) to (3), when an Echelle grating is used as diffraction grating 103, it can not be expected to improve resolving power of the spectrometer as shown in FIG. 10 by changing an angular dispersion value of the single pass beam or the double pass beam.

On the other hand, as seen from the expression (1), it is also possible to improve resolving power of the spectrometer as shown in FIG. 10 by lengthening a focal length of collimator lens 101. However, in this case, at least the space between slit board 100 and collimator lens 101 needs to be widened, and the system scale would be enlarged while resolving power can be improved.

SUMMARY OF THE INVENTION

The present invention has been accomplished in view of these problems. The first object of the present invention is to provide a spectrometer that can obtain fine information (information in the vicinity of a peak) with high accuracy and also obtain coarse information (information in a foot part around the peak) from a spectrum having specified wavelength components that are included in a light beam supplied from a light source without requiring an economical burden or troublesome labor. Moreover, the second object of the present invention is to provide a spectrometer which can realize high resolving power without enlarging a size of the apparatus.

In order to solve the above-mentioned problems, a spectrometer according to a first aspect of the present invention is used for measuring a spectrum of a light beam supplied from a light source, and comprises collimating means for changing a light beam supplied from a light source into a parallel light beam; first diffraction means for diffracting a specified wavelength component included in the parallel light beam into a predetermined direction; second diffraction means, which can be moved between a first position and a second position at least, for diffracting the parallel light beam output from the first diffraction means toward the first diffraction means so that the parallel light beam goes and returns K times, where K represents a natural number, between the first diffraction means and the second diffraction means; detection means for detecting the parallel light beam output from the first diffraction means, which has gone and returned K times between the first diffraction means and the second diffraction means; and control means for changing a value of K by moving the second diffraction means from one of the first position and the second position to the other at least.

In the above-mentioned constitution, for example, the first position is determined so that the parallel light beam which has gone and returned one time between the first diffraction means and the second diffraction means is focused on the detection means. On the other hand, the second position is determined so that the parallel light beam which has gone and returned two times between the first diffraction means and the second diffraction means is focused on the detection means. The parallel light beam which has gone and returned one time between the first diffraction means and the second diffraction means is used for obtaining coarse information of the spectrum. On the other hand, the parallel light beam which has gone and returned two times between the first diffraction means and the second diffraction means is used for obtaining fine information of the spectrum.

Further, a spectrometer according to a second aspect of the present invention is used for measuring a spectrum of a light beam supplied from a light source, and comprises collimating means for changing a light beam supplied from a light source into a parallel light beam; first diffraction means for diffracting a specified wavelength component included in the parallel light beam into a predetermined direction; second diffraction means for diffracting the parallel light beam output from the first diffraction means toward the first diffraction means so that the parallel light beam goes and returns between the first diffraction means and the second diffraction means; first detection means for detecting the parallel light beam output from the first diffraction means, which has gone and returned L times, where L represents a natural number, between the first diffraction means and the second diffraction means; and second detection means for detecting the parallel light beam output from the first diffraction means, which has gone and returned M times, where M represents a natural number larger than L, between the first diffraction means and the second diffraction means.

In the above-mentioned constitution, the parallel light beam which has gone and returned L times between the first diffraction means and the second diffraction means is used for obtaining coarse information of the spectrum. On the other hand, the parallel light beam which has gone and returned M times between the first diffraction means and the second diffraction means is used for obtaining fine information of the spectrum.

According to the present invention, fine information from a spectrum having specified wavelength components that are included in a light beam supplied from a light source can be obtained with high accuracy, and coarse information from the same spectrum can be obtained without requiring an economical burden or troublesome labor.

Furthermore, in the conventional spectrometer, a parallel light beam which contains a specified wavelength component of a light beam supplied from a light source is focused on the detection means after diffracted from one diffraction means. On the other hand, according to the present invention, a parallel light beam which contains a specified wavelength component of a light beam supplied from a light source is focused on the detection means after diffracted from both of the first diffraction means and the second diffraction means.

On this account, according to the present invention, the number of times of diffracting a parallel light beam which contains a specified wavelength component included in a light beam supplied from a light source can be made larger than that in the conventional spectrometer. As a result, an angular dispersion value larger than that in the conventional spectrometer can be obtained. That is, a smaller dispersion value can be obtained without lengthening a focal length of the collimating means. Accordingly, higher resolving power can be realized without enlarging a size of the apparatus.

BRIEF DESCRIPTION OF THE DRAWINGS

The present invention will be described in more detail in conjunction with the appended drawings, wherein.

DESCRIPTION OF THE PREFERRED EMBODIMENTS

Referring to accompanying drawings, embodiments of the present invention will be explained as follows.

At first, the first embodiment of the present invention will be explained with referring from FIGS. 1–8C.

Figure 1:
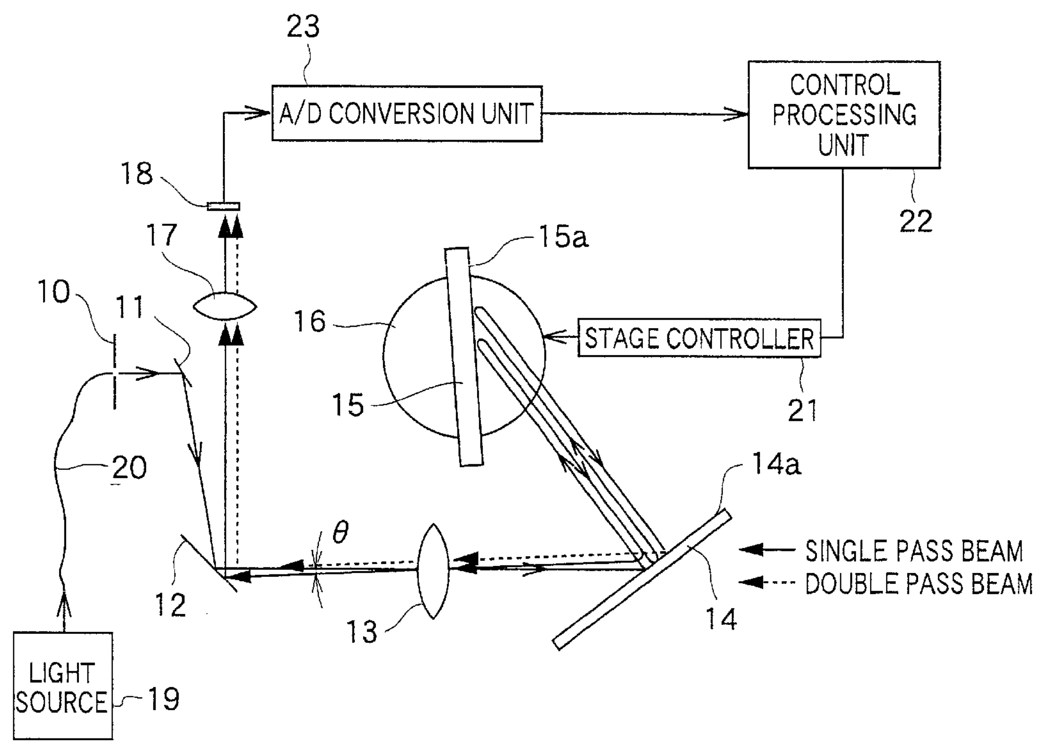
FIG. 1 is a diagram showing constitution of a spectrometer according to the first embodiment of the present invention.

A spectrometer as shown in FIG. 1 is an optical instrument used for measuring a spectrum of an excimer laser beam (for example, a wavelength $\lambda$=248.3 nm) radiated from light source 19. The spectrometer comprises slit board 10, mirrors 11 and 12, collimator lens 13, holographic grating 14, Echelle grating 15, rotation stage 16, magnifier lens 17 and line sensor 18 as the optical system.

The excimer laser beam supplied from light source 19 through optical fiber 20 passes through slit board 10 at a predetermined angle. The excimer laser beam that passed through slit board 10 is incident into collimator lens 13 through mirrors 11 and 12. A size of mirror 12 is designed so as to be larger than that of mirror 11.

Collimator lens 13 is a kind of optical element for collimating a light beam. The excimer laser beam that passed through mirrors 11 and 12 is changed into a parallel light beam by collimator lens 13. The parallel light beam output from collimator lens 13 is incident into holographic grating 14 at a predetermined incident angle $\alpha_1$ (referring to FIG. 2).

As to an incident angle and an output angle at holographic grating 14, an angular direction in which a parallel light beam is incident is defined as positive thereinafter.

Holographic grating 14 is a kind of dispersion optical element suitable for obtaining a diffraction light beam having a low order of diffraction. On surface 14*a* of holographic grating 14, there are formed a lot of groove lines which extends in a right angle against the paper of FIG. 2. Holographic grating 14 is arranged so that it diffracts the parallel light beam incident from collimator lens 13 toward Echelle grating 15 under a predetermined order of diffraction (for example, order of diffraction $m_1$=1).

In detail, holographic grating 14 is arranged so that it diffracts a parallel light beam with an incident angle $\alpha_1$ and an output angle $\beta_1$=0°. Owing to holographic grating 14, a beam width of the parallel light beam can be magnified more than that before diffraction.

A diffraction expression in holographic grating 14 is given as follows:

$$m_1 \cdot \lambda = d_1 (\sin \alpha_1 + \sin \beta_1 (=0)) \quad (4)$$

Where $d_1$ represents an interval of groove lines of the holographic grating and $\lambda$ represents a wavelength of a parallel light beam (an excimer laser beam) incident into the holographic grating.

Echelle grating 15 is a kind of dispersion optical element suitable for obtaining a diffraction light beam with a large diffraction angle. On surface 15*a* of Echelle grating 15, there are formed a lot of groove lines which extends in a right angle against the paper of FIG. 2. Echelle grating 15 has fewer groove lines than that of holographic grating 14. Echelle grating 15 is set on rotation stage 16. Therefore, groove lines of holographic grating 14 and groove lines of Echelle grating 15 spatially face each other in parallel when the apparatus is viewed from the upper side.

A diffraction expression in Echelle grating 15 is given as follows:

$$m_2 \cdot \lambda = d_2 (\sin \alpha_2 + \sin \beta_2) \quad (5)$$

Where $d_2$ represents an interval of groove lines of the Echelle grating, $\alpha_2$ represents an incident angle of the Echelle grating, $m_2$ represents an order of diffraction of the Echelle grating and $\beta_2$ represents an output angle of the Echelle grating.

As to an incident angle and an output angle at Echelle grating 15, an angular direction in which a parallel light beam is incident is defined as positive thereinafter.

Rotation stage 16 is electrically connected to control processing unit 22 (for example, an apparatus such as a personal computer and the like) through stage controller 21. And also, rotation stage 16 is electrically connected to line sensor 18 through A/D (analog-to-digital) conversion unit 23 which converts analog signal into digital signal. The operation of control processing unit 22 will be described in detail later.

Line sensor 18 is an optical element which is constructed by using a one-dimensional image sensor, a photo diode array or the like. Line sensor 18 has plural channels arranged in one-dimension, and each channel outputs a response according to intensity of a received light beam. Thus, spectral information of an excimer laser beam can be obtained on the basis of the response output from the plural channels. Alternatively, such channels may be arranged in two-dimension so as to add outputs of the channels of plural lines together for each row.

Next, arrangements of Echelle grating 15 which are suitable for detecting a single pass beam or a double pass beam by line sensor 18 will be explained with referring to FIGS. 2–6.

Figure 2:
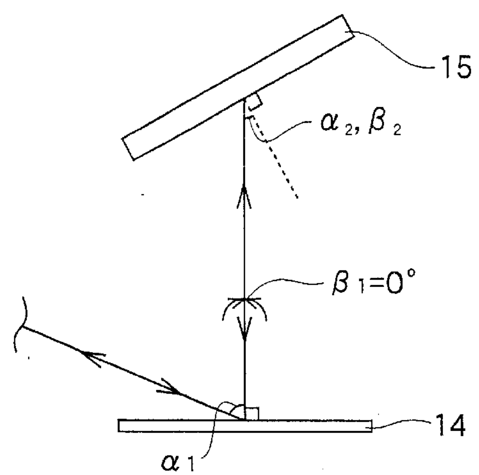
FIGS. 2–6 are diagrams for explaining setting arrangements of an Echelle grating in the spectrometer as shown in FIG. 1.

FIG. 2 shows the case where Echelle grating 15 is arranged in the Littrow arrangement in which an incident angle $\alpha_2$=an output angle $\beta_2=\phi$. In this case, a parallel light beam output from holographic grating 14 with an output angle of 0° is incident into Echelle grating 15 with an incident angle $\phi$ and is diffracted with an output angle $\phi$.

On this account, a part of the parallel light beam output from Echelle grating 15 with an output angle $\phi$ is diffracted from holographic grating 14 with an output angle $\alpha_1$ and becomes a single pass beam, while another part of the parallel light beam is directly reflected from holographic grating 14 with an output angle of 0°. Accordingly, the single pass beam never reaches line sensor 18 (with referring to FIG. 1), and it is impossible to obtain any information of a spectrum of the excimer laser beam supplied from light source 19.

Figure 3:
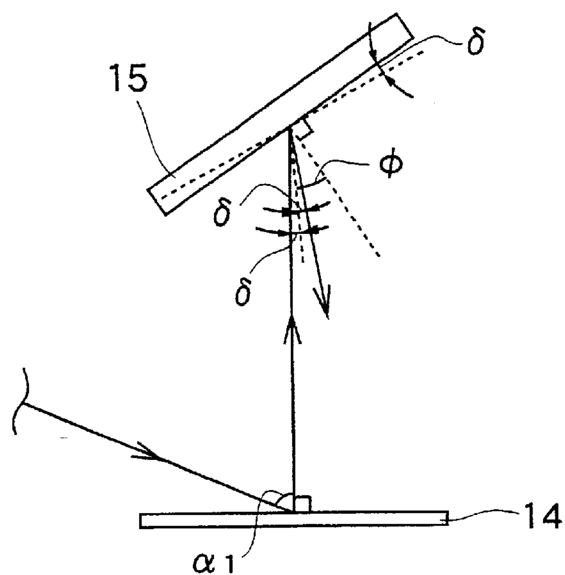

FIG. 3 shows an arrangement in which Echelle grating 15 is rotated by a slight angle $\delta$ in a counterclockwise direction from the Littrow arrangement. In this case, a parallel light beam output from holographic grating 14 with an output angle of 0° is incident into Echelle grating 15 with an incident angle $(\phi+\delta)$ and is diffracted by Echelle grating 15 with an output angle $(\phi-\delta)$. It should be noted that, in FIGS. 3–6, the slight angle $\delta$ is shown rather larger.

Figure 4:
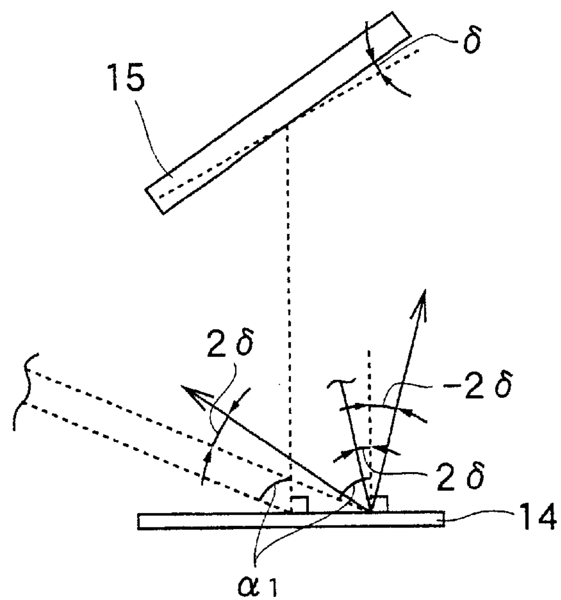

As shown in FIG. 4, the parallel light beam output from Echelle grating 15 with an output angle $(\phi-\delta)$ is incident into holographic grating 14 with an incident angle $2\delta$. Therefore, a part of the parallel light beam obtained by this incidence is diffracted by holographic grating 14 with an output angle $(\alpha_1-2\delta/\cos\alpha_1)$, that is, an angle smaller by $(2\delta/\cos\alpha_1)$ than that in the Littrow arrangement to become a single pass beam. On the other hand, another part of the parallel light beam is directly reflected by holographic grating 14 with an output angle $(-2\delta)$.

Figure 5:
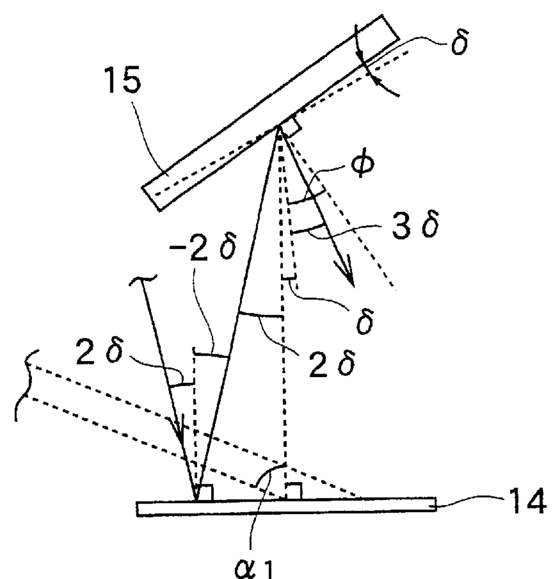

Further, as shown in FIG. 5, the parallel light beam output from holographic grating 14 with an output angle $(-2\delta)$ is incident into Echelle grating 15 with an incident angle $(\phi+3\delta)$ and is diffracted by Echelle grating 15 with an output angle $(\phi-3\delta)$.

Figure 6:
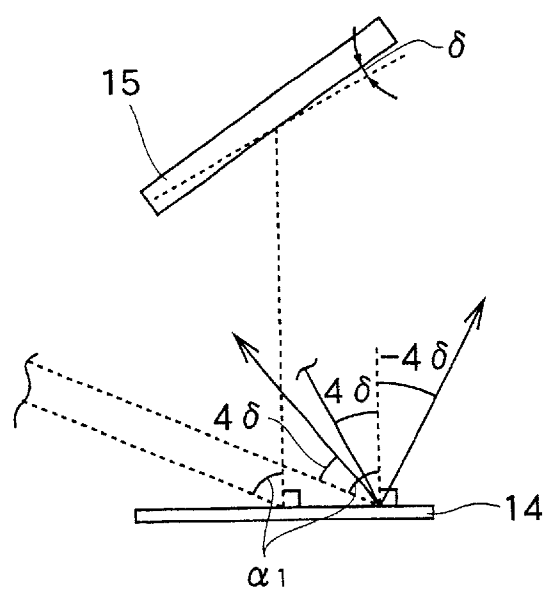

As shown in FIG. 6, the parallel light beam output from Echelle grating 15 with an output angle $(\phi-3\delta)$ is incident into holographic grating 14 with an incident angle $4\delta$. Therefore, a part of the parallel light beam obtained by this incidence is diffracted by holographic grating 14 with an output angle $(\alpha_1-4\delta/\cos\alpha_1)$ to become a double pass beam. On the other hand, another part of the parallel light beam is directly reflected from holographic grating 14 with an output angle $(-4\delta)$.

Accordingly, when the optical path reaching line sensor 18 and the optical axis of collimator lens 13 cross each other with an angle $\theta$, as shown in FIG. 1, the single pass beam can reach the channels of the middle portion of line sensor 18 by rotating Echelle grating 15 by an angle $\delta=(\theta/2)\cdot\cos\alpha_1$ in a counterclockwise direction from the Littrow arrangement. Also, the double pass beam can reach the channels of the middle portion of line sensor 18 by rotating Echelle grating is by an angle $\delta=(\theta/4)\cdot\cos\alpha_1$ in a counterclockwise direction from the Littrow arrangement.

Next, operation of control processing unit 22 will be explained in detail with referring to FIGS. 7 and 8A–8C.

The measured wavelength range of the single pass beam is wider than that of the double pass beam. Therefore, the single pass beam is suitable for obtaining coarse information of a spectrum of an excimer laser beam (information of a foot part around a peak of the spectrum). On the other hand, resolving power of the double pass beam is higher than that of the single pass beam as explained later. Therefore, the double pass beam is suitable for obtaining fine information of the spectrum of the excimer laser beam (information of the vicinity of the peak).

Figure 7:
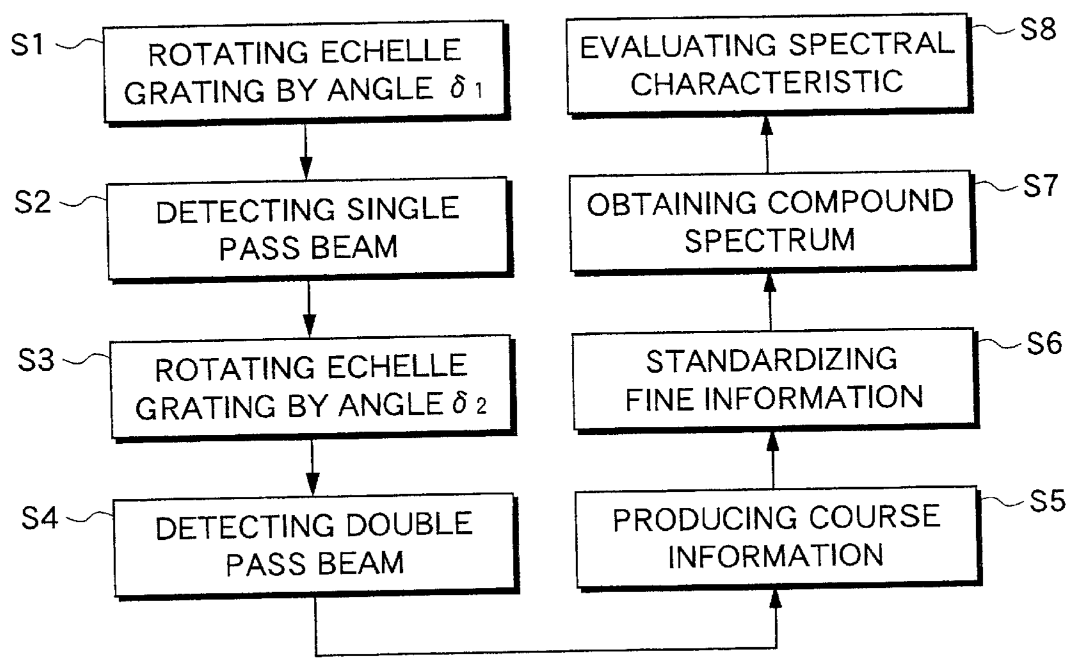
FIG. 7 is a flowchart for explaining operation of a control processing unit as shown in FIG. 1.

Therefore, in this embodiment at step S1 as shown in FIG. 7, control processing unit 22 supplies a predetermined control signal to rotation stage 16 through stage controller 21 so that Echelle grating 15 is rotated to a position different from the Littrow arrangement by a slight angle $\delta_1=(\theta/2)\cdot\cos\alpha_1$ by rotation stage 16. By executing step S1, the single pass beam can be focused on the channels of the middle portion of line sensor 18.

Figure 8A:
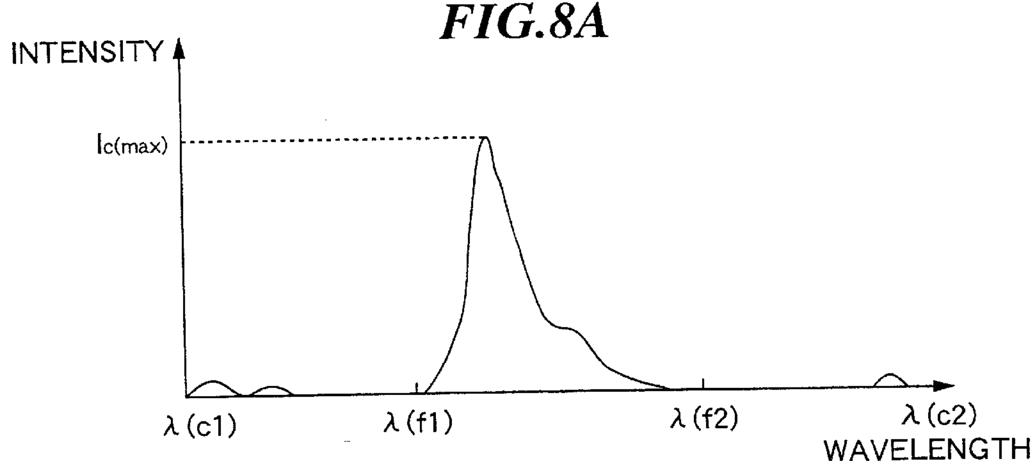
FIG. 8A is a diagram showing a spectrum of an excimer laser beam generated by detecting a single pass beam by using the spectrometer as shown in FIG. 1.

Then, at step S2, spectral information as shown in FIG. 8A is supplied and stored into control processing unit 22 through A/D conversion unit 23 by detecting the single pass beam by line sensor 18.

Next, at step S3, control processing unit 22 supplies another predetermined control signal (is different from that when the single pass beam is detected) to rotation stage 16 through stage controller 21 so that Echelle grating 15 is returned to a position different from the Littrow arrangement by a slight angle $\delta_2$ $(=(\theta/4)\cdot\cos\alpha_1)$ by rotation stage 16. By executing step S3, the double pass beam can be focused on the channels of the middle portion of line sensor 18.

Figure 8B:
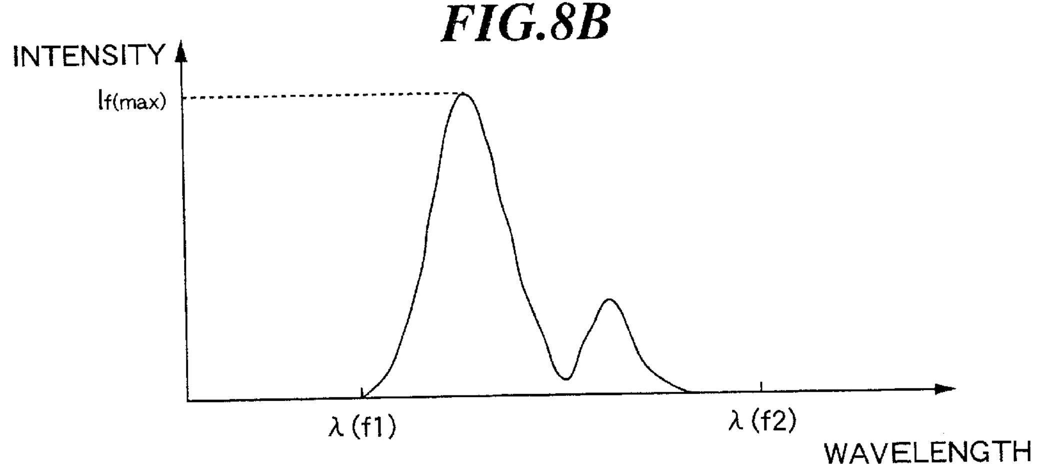
FIG. 8B is a diagram showing a spectrum of an excimer laser beam generated by detecting a double pass beam by using the spectrometer as shown in FIG. 1.

Further, at step S4, line sensor 18 detects the double pass beam so that spectral information as shown in FIG. 8B is supplied to control processing unit 22 through A/D conversion unit 23 and stored.

Next, at step S5, control processing unit 22 obtains information of a predetermined wavelength range (λ(c1)~λ(f1), λ(f2)~λ(c2)) as coarse information of a spectrum of the excimer laser beam. That is, the wavelength range extracted from a spectrum as shown in FIG. 8A to obtain the coarse information is defined by removing a full wavelength range (λ(f1)~λ(f2)) of a spectrum as shown in FIG. 8B from a full wavelength range of the spectrum as shown in FIG. 8A. For example, the width of the wavelength range (λ(c1)~λ(c2)) is set to be 100 pm and the width of the wavelength range (λ(f1)~λ(f2)) is set to be 50 pm.

Furthermore, at step S6, control processing unit 22 obtains information of the full wavelength range (λ(f1)~λ(f2)) of the spectrum as shown in FIG. 8B as fine information of the spectrum of the excimer laser beam, and standardizes a peak If (max) of the spectrum as shown in FIG. 8B to be equal to a peak Ic (max) of the spectrum as shown in FIG. 8A.

Figure 8C:
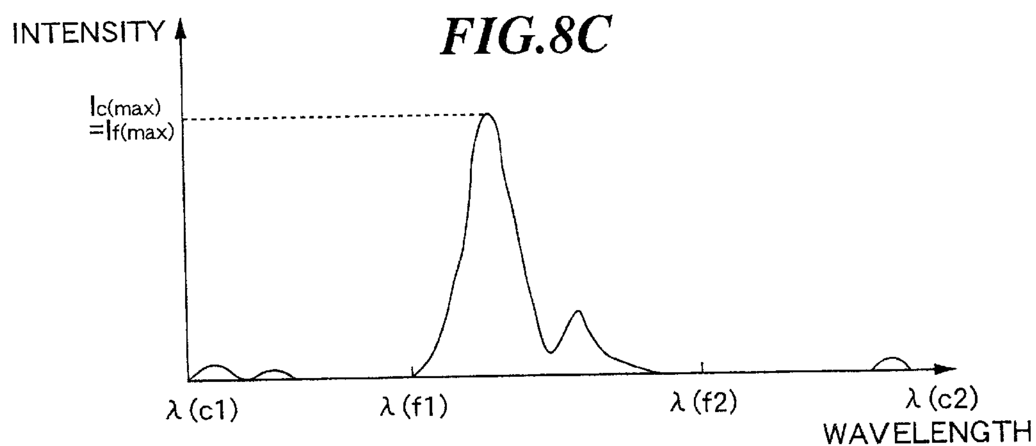
FIG. 8C is a diagram showing a compound spectrum obtained by compounding the spectrum as shown in FIG. 8A and the spectrum as shown in FIG. 8B.

Moreover, at step S7, control Processing unit 22 combines the coarse information obtained from the spectrum as shown in FIG. 8A and the fine information obtained from the spectrum as shown in FIG. 8B. As a result, a compound spectrum of the excimer laser beam is obtained as shown in FIG. 8C. After that, at step S8, a characteristic of the spectrum of the excimer laser beam is evaluated on the basis of the compound spectrum as shown in FIG. 8C.

Figure 10:
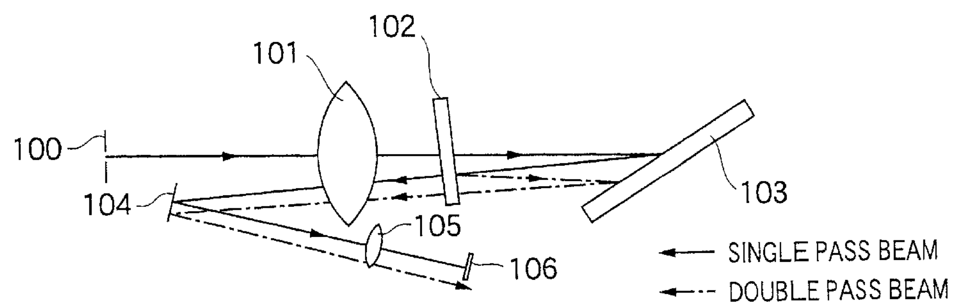
FIG. 10 is a diagram showing constitution of a conventional spectrometer.

Next, concrete dispersion values obtained by the spectrometer as shown in FIG. 1 will be explained in comparison with those obtained by the conventional spectrometer as shown in FIG. 10. Here, specification values in the spectrometer as shown in FIG. 1 are set as follows:

Wavelength of an excimer laser beam: $\lambda$=248.3 nm
Focal length of a collimator lens: f=1500 mm
Holographic grating
Interval of Groove lines: $d_1$=1/3600 mm
Order of diffraction: $m_1$=1
Incident angle: $\alpha_1$=63.4°
Output angle: $\beta_1$=0°
Echelle grating
Interval of Groove lines: $d_2$=1/94.13 mm
Order of diffraction: $m_2$=84
Incident angle: $\alpha_2$=79.0°
Output angle: $\beta_2$=79.0°
Line sensor size: swd=24 $\mu$m
Magnification rate of a magnifier lens: mag=5

The angle $\theta$ as shown in FIG. 1 can be ignored because of a very small angle. Accordingly, by considering expressions (4) and (5), an expression for obtaining an angular dispersion value when the single pass beam is detected is given as follows:

$$angDisp1=X_1+X_2+X_3 \quad (6)$$

$$X_1=m_1/(d_1\cdot\cos\alpha_1) \quad (7)$$

$$X_2=(m_2\cdot\cos\beta_1)/(d_2\cdot\cos\alpha_1\cdot\cos\beta_2) \quad (8)$$

$$X_3=(m_1\cdot\cos\beta_1\cdot\cos\alpha_2)/(d_1\cdot\cos\beta_1\cdot\cos\beta_2\cdot\cos\alpha_1) \quad (9)$$

Similarly, by considering expressions (4) and (5), an expression for obtaining an angular dispersion value when the double pass beam is detected is given as follows:

$$angDisp2=Y_1+Y_2+Y_3 \quad (10)$$

$$Y_1=m_1/(d_1\cdot\cos\alpha_1) \quad (11)$$

$$Y_2=(2m_2\cdot\cos\beta_1)/(d_2\cdot\cos\alpha_1\cdot\cos\beta_2) \quad (12)$$

$$Y_3=(m_1\cdot\cos\beta_1\cdot\cos\alpha_2)/(d_1\cdot\cos\beta_1\cdot\cos\beta_2\cdot\cos\alpha_1) \quad (13)$$

Therefore, in this embodiment, on the basis of expressions (1) and (6) to (9), a dispersion value of a single pass beam disp1 is given as follows:

$$disp1=0.029\ pm/ch \quad (14)$$

Also, in this embodiment, on the basis of expressions (1) and (10) to (13), a dispersion value of a double pass beam disp2 is given as follows:

$$disp2=0.016\ pm/ch \quad (15)$$

On the other hand, specification values in the conventional spectrometer are set as follows:

Wavelength of an excimer laser beam: $\lambda$=248.3 nm
Focal length of a collimator lens: f=1500 mm
Diffraction grating
Interval of groove lines: d=1/3600 mm
Order of diffraction: m=84
Incident angle: $\alpha$=79.0°
Output angle: $\beta$=79.0°
Line sensor size: swd=24 $\mu$m
Magnification rate of a Magnifier lens: mag=5

Therefore, according to expressions (1) to (3), a dispersion value of a single pass beam disp1 and a dispersion value of a double pass beam disp2 in the conventional spectrometer are given as follows:

$$disp1=0.077\ pm/ch \quad (16)$$

$$disp2=0.039\ pm/ch \quad (17)$$

By comparing numerical values (14) with (16) and (15) with (17), dispersion values in this embodiment are smaller than those in the conventional spectrometer. The reason why the dispersion values can be reduced is supposed as follows:

(a) Since a light beam supplied from a light source is diffracted by the holographic grating in addition to the Echelle grating, an angular dispersion value is enlarged in comparison with the conventional spectrometer even if an order of diffraction in Echelle grating is the same as that of the conventional spectrometer.

(b) The holographic grating is arranged so that it outputs the parallel light beam incident from the collimator lens with an output angle of 0°. Therefore, the beam width of the parallel light beam can be magnified when the parallel light beam is diffracted by the holographic grating.

As explained above, according to this embodiment, fine information can be obtained from a spectrum having specified wavelength components that are included in a light beam supplied from a light source with high accuracy, and also coarse information can be obtained from the spectrum without requiring an economical burden and troublesome labor. Furthermore, higher resolving power can be realized without enlarging a size of the apparatus.

Additionally, by developing the consideration on the basis of FIGS. 2–6, control processing unit 22 may control rotation stage 16 to rotate Echelle grating 15 by a slight angle $\delta_3$ (=($\theta$/6)·cos $\alpha_1$) from the Littrow arrangement. In this case, a triple pass beam (a parallel light beam output from holographic grating 14 which has gone and returned three times between holographic grating 14 and Echelle grating 15) can be focused on the channels of the middle portion of line sensor 18.

In this case, information in the vicinity of the peak of the spectrum of the excimer laser beam can be extracted from a spectrum obtained by detecting the triple pass and used for obtaining a compound spectrum of the excimer laser beam. As a result, a compound spectrum of the excimer laser beam can be obtained with higher accuracy in the vicinity of the peak.

Further, in this case, by considering expressions (4) and (5), an expression for obtaining an angular dispersion value when the triple pass beam is detected is given as follows:

$$angDisp3=Z_1+Z_2+Z_3 \quad (18)$$

$$Z_1=m_1/(d_1\cdot\cos\alpha_1) \quad (19)$$

$$Z_2=(3m_2\cdot\cos\alpha_1)/(d_2\cdot\cos\alpha_1\cdot\cos\beta_2) \quad (20)$$

$$Z_3=(m_1\cdot\cos\beta_1\cdot\cos\alpha_2)/(d_1\cdot\cos\beta_1\cdot\cos\beta_2\cdot\cos\alpha_1) \quad (21)$$

Also, on the basis of expressions (18) to (21), a dispersion value of the triple pass beam disp3 is given as follows:

$$disp3=0.011\ pm/ch \quad (22)$$

Accordingly, when a triple pass having enough intensity can be obtained, higher resolving power can be realized.

Figure 9:
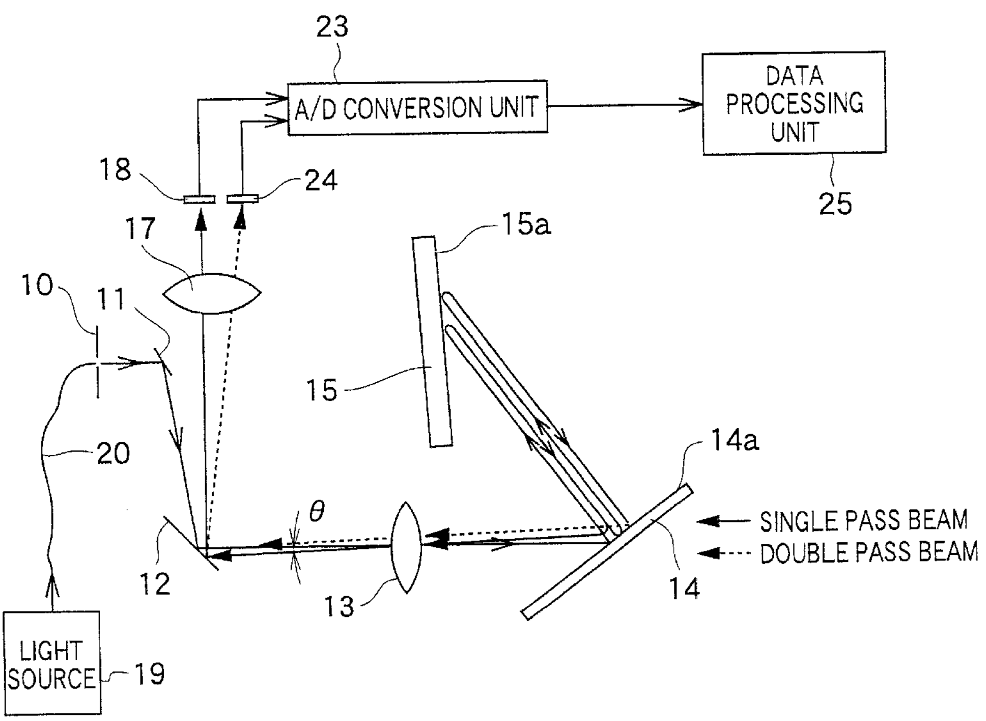
FIG. 9 is a diagram showing constitution of a spectrometer according to the second embodiment of the present invention.

Next, the second embodiment of the present invention will be explained with referring to FIG. 9. The same reference numeral is given to the common elements to the first embodiment and explanation about the common elements will be omitted.

A spectrometer according to this embodiment is constructed by adding another line sensor 24 instead of eliminating rotation stage 16 in a spectrometer as shown in FIG. 1. That is, in the constitution of the spectrometer, line sensor 18 detects a single pass beam, while line sensor 24 detects a double pass beam.

Line sensor 18 is arranged so that the single pass beam, which has passed through magnifier lens 17, is focused on the channels arranged in the middle portion of line sensor 18. Line sensor 18 is electrically connected to data processing unit 25 (for example, an apparatus such as a personal computer or the like) through A/D conversion unit 23. Therefore, a detection result of the single pass beam by line sensor 18 is supplied to data processing unit 25 through A/D conversion unit 23.

Line sensor 24 is arranged adjacent to line sensor 18 so that the double pass beam, which has passed through magnifier lens 17, is focused on the channels arranged in the middle portion of line sensor 24. Line sensor 24, similarly to line sensor 18, is electrically connected to data processing unit 25 through A/D conversion unit 23. Therefore, a detection result of the double pass beam by line sensor 24 is supplied to data processing unit 25 through A/D conversion unit 23.

Data processing unit 25 is set up so as to obtain coarse information in a spectrum of an excimer laser beam on the basis of a detection result of a single pass beam which is supplied from line sensor 18 through A/D conversion unit 23, and obtain fine information in the spectrum of the excimer laser beam on the basis of a detection result of a double pass beam which is supplied from line sensor 24 through A/D conversion unit 23.

Further, data processing unit 25 is set up so as to obtain a compound spectrum of the excimer laser beam by compounding coarse information and fine information in the spectrum of the excimer laser beam together under suitable processing.

The most remarkable characteristic of the spectrometer according to this embodiment is to have line sensor 18 for detecting the single pass beam and line sensor 24 for detecting the double pass beam separately. The single pass beam is focused on the channels arranged in the middle portion of line sensor 18. On the other hand, the double pass beam is focused on the channels arranged in the middle portion of line sensor 24. Therefore, image shift that occurs in the case where both of the single pass beam and the double pass beam are detected by lengthening a size of the line sensor in the longitudinal direction is prevented. According to this embodiment, similar effect to that of the first embodiment can be obtained.

Moreover, in this embodiment, another line sensor may be added which is arranged in the position where a triple pass beam is focused. As a result, it is possible to detect the triple pass beam. In this case, the third line sensor is electrically connected to data processing unit 25 through A/D conversion unit 23 so that a detection result of the triple pass beam is supplied to data processing unit 25 through A/D conversion unit 23.

Accordingly, information in the vicinity of a peak is extracted from the spectrum of the excimer laser beam which is obtained from the detected triple pass beam and the information is used for obtaining a compound spectrum of the excimer laser beam. As a result, a compound spectrum can be obtained with higher accuracy in the vicinity of the peak.

As explained above, according to the present invention, not only fine information (information in the vicinity of the peak) can be obtained from a spectrum having specified wavelength components that are included in a light beam supplied from a light source with high accuracy without requiring an extra cost and complicated process. Also, coarse information (information in a foot part of the peak) can be obtained from the spectrum. Moreover, a spectrometer having higher resolving power can be realized without enlarging a size of the apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A spectrometer for measuring a spectrum of a light beam supplied from a light source, said spectrometer comprising:

collimating means for changing a light beam supplied from a light source into a parallel light beam;

first diffraction means for diffracting a specified wavelength component included in the parallel light beam into a predetermined direction;

second diffraction means, which is operable to be moved between a first position and a second position at least, for diffracting the parallel light beam output from said first diffraction means toward said first diffraction means so that the parallel light beam goes and returns K times, where K represents a natural number, between said first diffraction means and said second diffraction means;

detection means for detecting the parallel light beam output from said first diffraction means, which has gone and returned K times between said first diffraction means and said second diffraction means; and control means for changing a value of K by moving said second diffraction means from one of the first position and the second position to the other at least.

2. A spectrometer according to claim 1, wherein:

said second diffraction means is operable to be moved to a third position; and said control means moves said second diffraction means to the third position so that the parallel light beam goes and returns N times, where N represents a natural number larger than K, between said first diffraction means and said second diffraction means.

3. A spectrometer for measuring a spectrum of a light beam supplied from a light source, said spectrometer comprising:

collimating means for changing a light beam supplied from a light source into a parallel light beam;

first diffraction means for diffracting a specified wavelength component included in the parallel light beam into a predetermined direction;

second diffraction means for diffracting the parallel light beam output from said first diffraction means toward said first diffraction means so that the parallel light beam goes and returns between said first diffraction means and said second diffraction means;

first detection means for detecting the parallel light beam output from said first diffraction means, which has gone and returned L times, where L represents a natural number, between said first diffraction means and said second diffraction means; and second detection means for detecting the parallel light beam output from said first diffraction means, which has gone and returned M times, where M represents a natural number larger than L, between said first diffraction means and said second diffraction means.

4. A spectrometer according to claim 3, further comprising:

third detection means for detecting a parallel light beam, which has gone and returned N times, where N represents a natural number larger than M, between said first diffraction means and said second diffraction means.

5. A spectrometer according to claim 1, wherein:

said first diffraction means includes a holographic grating; and said second diffraction means includes an Echelle grating.

6. A spectrometer according to claim 2, wherein:

said first diffraction means includes a holographic grating; and said second diffraction means includes an Echelle grating.

7. A spectrometer according to claim 3, wherein:

said first diffraction means includes a holographic grating; and said second diffraction means includes an Echelle grating.

8. A spectrometer according to claim 4, wherein:

said first diffraction means includes a holographic grating; and said second diffraction means includes an Echelle grating.

* * * * *